United States Patent
Knight

(10) Patent No.: US 11,173,506 B2
(45) Date of Patent: Nov. 16, 2021

(54) PUMP DISPENSERS, ESPECIALLY FOAM DISPENSERS

(71) Applicant: RIEKE PACKAGING SYSTEMS LIMITED, Leicestershire (GB)

(72) Inventor: Simon Christopher Knight, Bridgend (GB)

(73) Assignee: RIEKE PACKAGING SYSTEMS LIMITED

( * ) Notice: Subject to any disclaimer, the term of this patent is extended or adjusted under 35 U.S.C. 154(b) by 0 days.

(21) Appl. No.: 16/763,042
(22) PCT Filed: Nov. 9, 2018
(86) PCT No.: PCT/EP2018/080844
§ 371 (c)(1),
(2) Date: May 11, 2020
(87) PCT Pub. No.: WO2019/092223
PCT Pub. Date: May 16, 2019

(65) Prior Publication Data
US 2020/0384488 A1 Dec. 10, 2020

(30) Foreign Application Priority Data
Nov. 9, 2017 (GB) .................................. 1718524

(51) Int. Cl.
*B05B 7/00* (2006.01)
*B05B 11/00* (2006.01)
(Continued)

(52) U.S. Cl.
CPC ............ *B05B 7/005* (2013.01); *B05B 7/0416* (2013.01); *B05B 11/0044* (2018.08);
(Continued)

(58) Field of Classification Search
CPC ... B05B 7/005; B05B 11/0044; B05B 7/0416; B05B 11/3001; B05B 11/3067;
(Continued)

(56) References Cited

U.S. PATENT DOCUMENTS 3,237,571 A * 3/1966 Corsette .............. B05B 11/3066
417/513
4,079,865 A * 3/1978 Kutik .................. B05B 11/3015
222/259

(Continued)

FOREIGN PATENT DOCUMENTS

GB 2079384 A 1/1982

OTHER PUBLICATIONS

International Search Report and Written Opinion dated Feb. 15, 2019; International Patent Application No. PCT/EP2018/080844 filed on Nov. 9, 2018. ISA/EP.

*Primary Examiner* — Vishal Pancholi
(74) *Attorney, Agent, or Firm* — McDonald Hopkins LLC

(57) ABSTRACT

Pump dispenser comprising a pump and a container for liquid to be dispensed, the pump comprising a pump body mounted in the neck of the container and a plunger reciprocable relative to the pump body to alter the volume of a pump chamber defined in the pump body and having an inlet and an outlet, the outlet leading through an outlet passage to a discharge opening. The pump cylinder body is retained at the container neck. A vent is provided in the cylinder body wall adjacent the neck edge. A vent block ring is disposed in the cylinder body adjacent the vent, and is moveable between blocked and unblocked positions relative to the vent. The vent block ring has an integral upward projecting formation which is engaged by part of the plunger in a locked-down position of the plunger, so that when the plunger is locked down the vent block element blocks the vent, while in a relatively extended position of the plunger the vent block element is in the unblocked position.

13 Claims, 4 Drawing Sheets

(51) Int. Cl.
 *B05B 7/04* (2006.01)
 *G01F 11/02* (2006.01)
(52) U.S. Cl.
 CPC ...... *B05B 11/3001* (2013.01); *B05B 11/3067* (2013.01); *G01F 11/028* (2013.01)
(58) Field of Classification Search
 CPC . B05B 11/306; B05B 11/3087; B05B 7/0025; G01F 11/028
 USPC ............ 222/71, 321, 384, 481, 153.13, 309, 222/321.7, 481.5
 See application file for complete search history.

(56) References Cited

U.S. PATENT DOCUMENTS

| | | | |
|---|---|---|---|
| 4,524,888 A * | 6/1985 | Tada | B05B 11/0064 222/153.02 |
| 5,016,780 A * | 5/1991 | Moretti | B05B 11/3001 222/153.13 |
| 5,405,057 A * | 4/1995 | Moore | B05B 11/3023 222/153.13 |
| 5,524,793 A * | 6/1996 | O'Neill | B05B 11/306 222/153.13 |
| 6,443,331 B1 | 9/2002 | Dejonge | |
| 8,827,121 B2 * | 9/2014 | Law | B05B 11/306 222/321.9 |
| 2002/0056730 A1 * | 5/2002 | van de Heijden | B05B 11/0005 222/190 |
| 2008/0083784 A1 | 4/2008 | Foster et al. | |

* cited by examiner

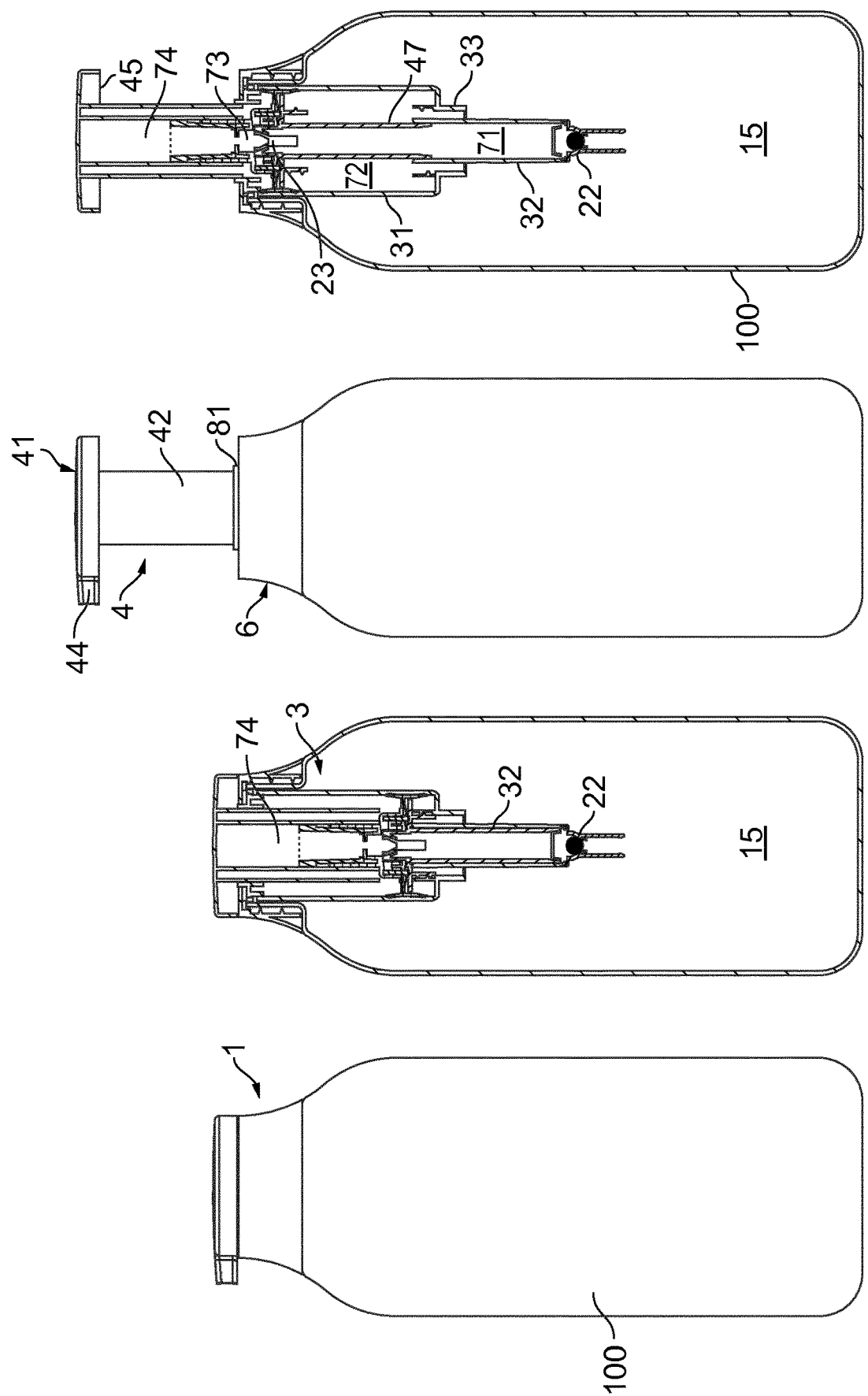

PUMP DISPENSERS, ESPECIALLY FOAM DISPENSERS

CROSS-REFERENCE TO RELATED APPLICATION

This application is a 35 U.S.C. 371 national stage filing of PCT Application No. PCT/EP2018/080844 filed on Nov. 9, 2018, entitled "PUMP DISPENSERS, ESPECIALLY FOAM DISPENSERS," which claims priority to GB Patent Application No.: 1718524.0 filed on Nov. 9, 2017, each of which are incorporated herein in their entirety by reference.

FIELD OF THE INVENTION

The present proposals have to do with hand-operated pump dispensers, such as are widely used for toiletries, household products, medicaments and the like, and which are generally made substantially or entirely from moulded plastics components. Our proposals are particularly concerned with structures enabling the venting of air in such dispensers. Preferred embodiments of the proposals are in the context of foamers, that is to say dispensers adapted to dispensed foam from a supply of foamable liquid held in a container to which the pump is fitted. However the proposals may be implemented in other types of dispensers.

BACKGROUND

The general format of a pump dispenser of the kind to which these proposals relate is well-established. The dispenser comprises a pump with a body which is mounted in the neck of a container for the liquid to be dispensed. The pump also has a plunger reciprocable relative to the body to alter the volume of a pump chamber defined in the pump body and having an inlet and an outlet. The inlet is connected with the container interior to receive liquid, usually through a dip tube in the typical case that the dispenser is to be used upright with the pump above the container. The outlet leads through an outlet passage to a discharge opening, usually defined in a discharge nozzle. The pump has one or more check valves (at least an inlet valve, usually also an outlet valve) to prevent reverse flow so that reciprocation of the plunger sequentially refills (primes) the pump chamber through the inlet and then discharges the chamber contents through the outlet. Often the pump chamber is defined between a cylinder and piston which works in the cylinder, one on each of the plunger and body. Sometimes pump chambers with deformable walls, such as bellows, are used instead. Often much, most or all of the pump chamber or pump body is recessed down into the container interior, below the neck opening. A pump spring is usually included, urging the plunger to a position corresponding to maximum pump chamber volume.

The present proposals may be implemented in any pump dispenser as described; preferably it is in the popular form in which the pump body defines a cylinder mounted fixedly to the container neck, with the cylinder recessed down into the container interior below the neck opening. The pump plunger carries a piston working in the cylinder, and reciprocates along a plunger axis in line with the neck axis. The pump spring urges the plunger towards its extended (outward or uppermost) position. Liquid enters the pump chamber through an inlet having an inlet check valve, and leaves the pump chamber through an outlet having an outlet check valve. Preferably the outlet passage is defined within a stem of the plunger, communicating up to a head of the plunger including a discharge nozzle.

Preferred embodiments of the present proposals are in the context of foam dispensers of the kind now described, and referred to in what follows as foam dispensers "of the kind described". A foam dispenser of the kind described has the features described above for a pump dispenser, providing both a liquid pump and an air pump in the same device. The liquid pump has a liquid pump chamber defined between a liquid cylinder and a liquid piston, and the air pump has an air pump chamber defined between an air cylinder and an air piston. Preferably these components are arranged concentrically around a plunger axis of the pump. The liquid piston and air piston are reciprocable together in their respective cylinders by the action of the pump plunger; typically the two pistons are integrated with and move with the plunger. An air inlet valve and a liquid inlet valve are provided for the air chamber and liquid chamber. An air discharge passage and a liquid discharge passage lead from the respective chambers to the same outlet passage by way of a permeable foam-generating or foam-regulating element, preferably comprising one or more perforated or mesh layers through which the air and liquid pass as a mixture. Preferably the air discharge passage and liquid discharge passage meet at a mixing chamber or mixing region immediately upstream of the permeable element.

Such foam dispensers are widely known: examples are described in our EP-A-1190775, U.S. Pat. No. 7,802,701 and WO2014/099243.

Usually the air cylinder and liquid cylinder are concentric. They may be moulded together in one piece of plastics material. Sometimes however a part, e.g. a part forming the inlet end of the liquid cylinder, is made as a discrete portion for ease of moulding. A main cylinder-forming component (cylinder body) is usually secured onto the container neck by an outward flange thereof, which is trapped against the edge of the container neck by a retaining collar or cap as described above, secured by a thread or snap fitting.

There is a general need in pump dispensers to allow air into the container, usually at or via the pump structure, to compensate for the volume of liquid dispensed; otherwise negative container pressure may cause problems in dispensing or partial container collapse. A conventional vent arrangement provides one or more small vent holes through a wall of the cylinder body near the top, such as (in a foam dispenser) in the air cylinder wall above where the air piston operates during its stroke. Clearance exists between the plunger stem and the surrounding collar or cap of the fixed pump module, and air can enter through this clearance and into the container interior through the one or more vent holes. In a foamer such air entering through or around the plunger is also used for pumping to generate foam, by means of an air inlet valve in the top of the air piston. In foam dispensers, the vent hole is conventionally covered (bridged) by upper and lower sealing lips of the air piston seal when the plunger is in the extended position, i.e. when the dispenser is not being used. This blocks and isolates the vent, preventing liquid from leaking out from the container through the vent and through the pump mechanism to the exterior e.g. during shipping or when the dispenser is knocked over.

Foam dispensers are conventionally made as "up-lockers" in which for shipping or other transit the plunger can be axially held in the extended position to prevent unintended dispensing. Usually this is by turning the plunger relative to the pump body to engage cams, lugs or a screw thread of the plunger shaft with a corresponding up-lock formation of the pump body e.g. closure cap or collar. This action also enables blocking of the air cylinder vent as described. Taking into account also the substantial stroke length needed to pump sufficient air, conventional foamers are tall on the container and this is space-wasting and inefficient for transport and retail display. WO2008/045820 and WO2008/045822 describe foam dispensers with a plunger lock for the down position and associated vent blocking arrangement, but to achieve this the air chamber of the foamer is raised above the container neck level and venting provided below it, so the construction is still tall and bulky.

The Invention

It is an aim of the present proposals to provide new and useful pump dispensers, particularly foam dispensers, in which a plunger of the dispenser can be locked down and a vent opening blocked against leakage of liquid from the container interior in the locked-down condition.

In a first aspect we propose a pump dispenser of the kind described with a lock-down feature and in which the cylinder body has a wall with an edge formation retained at or on the container neck edge. There is a vent in the cylinder body wall adjacent the container neck edge, to communicate between the container interior and the interior of the cylinder body. A vent block element is disposed in the cylinder body adjacent the vent, and is moveable between blocked and unblocked positions relative to the vent. The vent block element has an associated actuating element or formation, preferably as an integral part thereof, which is engaged by a corresponding actuating formation of the plunger selectively in the locked-down position of the plunger, whereby when the plunger is locked down the vent block element blocks the vent, while in a relatively extended position of the plunger—perhaps any position other than the locked down position, but optionally excluding a fully-extended position—the vent block element is in the unblocked position.

Alternatively stated the vent block element is engaged by the plunger selectively in a retracted position of the plunger, to actuate or hold the vent block element towards or in the blocked position, and/or to actuate or hold the vent block element towards or in the unblocked position. The vent block element may be annular, extending around the cylinder body. There may be more than one vent circumferentially spaced. The same vent block element may control each of plural vents. Usually the vents are through-holes in the cylinder body wall. The movement of the vent block element between the blocked and unblocked positions (in either direction) may be axial or circumferential (rotational) relative to the cylinder body. Additionally or alternatively it may be or comprise a rotation, twisting, deformation or other relative movement within the vent block element itself, or other non-translational movement thereof. Preferably it is or comprises an axial movement.

Preferably the vent block element is positively shifted (raised and/or turned) from the blocked to the unblocked position, being engaged by the action of the plunger movement from the locked-down to a release condition. This action may be or include an axial rise of the plunger, and/or extension of the plunger towards an extended (up) position. For example the vent block element may make an axial force-transmitting engagement with the plunger stem or head, either frictionally or with some radial interlock or interference, causing the rising plunger to shift the vent block element to the unblocked state. An inward lip or projection of the vent block element engaging radially inwardly against the stem may be used. This projection may make a seal against the stem or may provide for venting between the element and stem according to the choice of vent path.

Alternatively structure of the pump body engaging the vent block element may make a ramp or cam engagement with the vent block element whereby that element tends to move to or stay in the unblocked position unless held in or moved to the blocked position. This may be by progressive increasing deformation of the vent block element or of said adjacent structure against a resilience thereof as they move relatively towards the blocked position. Or, alternatively stated, it may be by relaxation of the vent block element or of said adjacent structure from a deformed condition as they move relatively towards the unblocked position. In such cases the engagement of the plunger by the actuating formation may urge the vent block element positively towards the blocked position, but need not drive it positively away when unlocked because it can move spontaneously.

Where the movement of the vent block element between the blocked and unblocked positions is a circumferential (rotational) movement relative to the cylinder body, it may suitably be driven by a corresponding rotation of the plunger as it is locked down. For rotational actuation the vent block element may need to be formed with circumferentially-distinct regions (one or more window regions, one or more blocking regions) and this may require selective alignment of components on assembly. However the rotational action can be very positive, and easily arranged to operate in both turning directions if necessary, without resilient behavior of the block element. Conversely an axially-moving blocking element may have the convenience, if annular, of having a simple uniform cross-section not requiring assembly alignment. An annular vent block element is preferred.

Preferably the actuating formation of the plunger is on the underside of a head of the plunger, e.g. comprises the lower edge of one or more radial reinforcing ribs thereof and/or a lower part of a nozzle on the head, or an outward shoulder. A downward radial edge is apt for driving either axially, especially down into the pump body for blocking actuation, and/or in rotation depending on the mode of movement selected for the vent block element. An engagement for unblocking actuation may be made radially inwardly against the stem, as mentioned above.

The pump body, e.g. a retaining cap or collar component thereof, may define a clearance or opening such as a slot, e.g. an annular or part-annular slot around the plunger stem, through which the actuating formation of the plunger and the vent block element can engage one another. The associated actuating element or actuating formation of the vent block element may be exposed at or project axially up through this clearance or opening, for engagement by the actuating formation of the plunger at least in the locking/blocking action. It may be an upward projection, e.g. an annular upward projection on an annular vent block element. However it is also possible for the plunger stem or head to have an actuator formation that extends down through such a clearance to engage a vent block element beneath.

Preferably the first aspect is embodied in a foam dispenser of the kind described. The cylinder body wall having the vent may then be the wall of the air cylinder. The foam dispenser may then be adapted for lock-down of the plunger e.g. as described below in the second aspect.

The vent path may lead from the cylinder wall vent interior opening to the exterior past the vent block element and via the pump mechanism, e.g. around the plunger (such as in a conventional manner). Or, the vent path may lead from the cylinder wall vent interior opening to the exterior up over the edge of the cylinder body, e.g. through recesses or grooves provided for this purpose in a locating flange thereof. From there the vent path may lead around the edge of the container neck and out through a clearance defined by a retaining element or cap, e.g. through the clearances of securing formations such as threads which hold the retaining element onto the container neck. In this version the pump body may seal around the plunger stem, e.g. by wiping engagement of an annular vent block element.

A second aspect of our proposals is a foam dispenser of the kind described, i.e. having a cylinder body defining an air cylinder and a liquid cylinder, in which the plunger and cylinder body have respective lock-down formations engageable to lock the plunger in a fully-retracted position. The fully-retracted position may be at a position axially below the bottom of the pumping stroke.

The lock-down formations preferably engage by rotation, and may comprise threads, cams or lugs and slots or clearances. Preferably the formations engage with a cam action, such as with threads, so that progressive rotation to a locked position also urges the plunger down axially. This action may help to operate a vent block of the first aspect and this is the most preferred embodiment of our proposals.

The lock-down formations may be in the pump chamber component, preferably in the air pump chamber rather than in the liquid pump chamber. In the preferred aspect they lie below the vent block element of the first aspect so as to be fully enclosed in the locked-down state.

The plunger lock-down formation may be beneath the underside of the air piston, or on or at the underside. The plunger lock-down formation may comprise one or more downward projections, e.g. a downward skirt, having a thread or cam segments.

The body lock-down formation may be at a lower region of the air pump chamber, e.g. at a convergence or transition portion of the cylinder body at the transition from the larger-diameter air cylinder to the smaller-diameter liquid cylinder where there is upwardly-directed surface available. The body lock-down formation may comprise one or more upward projections, e.g. an upward skirt having a thread or cam segments.

A pump spring is also preferably in the air chamber, to avoid metal contact with liquid.

As mentioned, the preferred aspect ("preferred foamer concept") is a dispenser which is a foamer embodying both aspects described above, in any combination of their general and preferred features.

In the preferred foamer concept the dose size (volume of liquid dispensed per stroke) is preferably from 0.5 to 3 ml, more preferably 1 to 2 ml. The preferred ratio of dispensed air volume to liquid volume per stroke is at least 6.

By providing lock-down in combination with foamer and sealed vent features, the preferred foamer concept presents or enables special advantages and novelties.

A problem with conventional foamers, as mentioned, is the tall profile of the pump above the container, especially for shipping. A lock-down foamer enables more product per shipped volume, reducing shipping costs. It is also generally more robust and less prone to damage because of the recessing of more of the pump device, and so more suitable for demanding shipping modes such as by post, e-commerce and the like.

Also, because of the lock-down the pump plunger stroke need not be shortened as has been done in conventional foamers to reduce their shipping height. To shorten plunger height/stroke at a given dose the solution has been a large cross-section of the pump cylinder body. However this uses more material for the pump and increases cost and weight, while preventing use with the conventional and more economical smaller-necked containers. In the preferred foamer concept the plunger height and stroke cease to be an issue because the plunger can be locked down for shipping. Accordingly a relatively longer stroke and smaller cylinder cross-section can be used, reducing (for a given dose size) the cost and weight of the pump and enabling use with smaller-necked containers.

Preferably the container neck has a diameter less than 40 mm, more preferably less than 36 mm. It may be e.g. the conventional 33 m size. These sizes can be applied in conjunction with the preferred dose sizes mentioned above, such as a liquid dose of 1 ml or more e.g. 1.4 ml or more with a neck size of less than 36 mm e.g. about 33 mm.

It should be understood that while in this description the terms top, bottom, up, down etc are used for general ease of comprehension, and because many dispensers of the kind described are used in that orientation and indeed are preferred herein, it is not strictly required that the pump components have that orientation and unless the context requires otherwise these terms can be regarded as denoting the relative rather than absolute positions.

BRIEF DESCRIPTION OF THE DRAWINGS

An embodiment of our proposals is now described by way of example, with reference to the accompanying drawing figures in which:

FIG. 1 is an exterior elevation of a foam dispenser in a locked-down position;

FIG. 2 is an axial cross-section of FIG. 1 showing a general disposition of internal components;

FIG. 3 is an elevation showing the same foam dispenser with the plunger extended;

FIG. 4 is a further axial cross-section showing the general disposition of internal components in the extended position;

DETAILED DESCRIPTION

Figure 5:
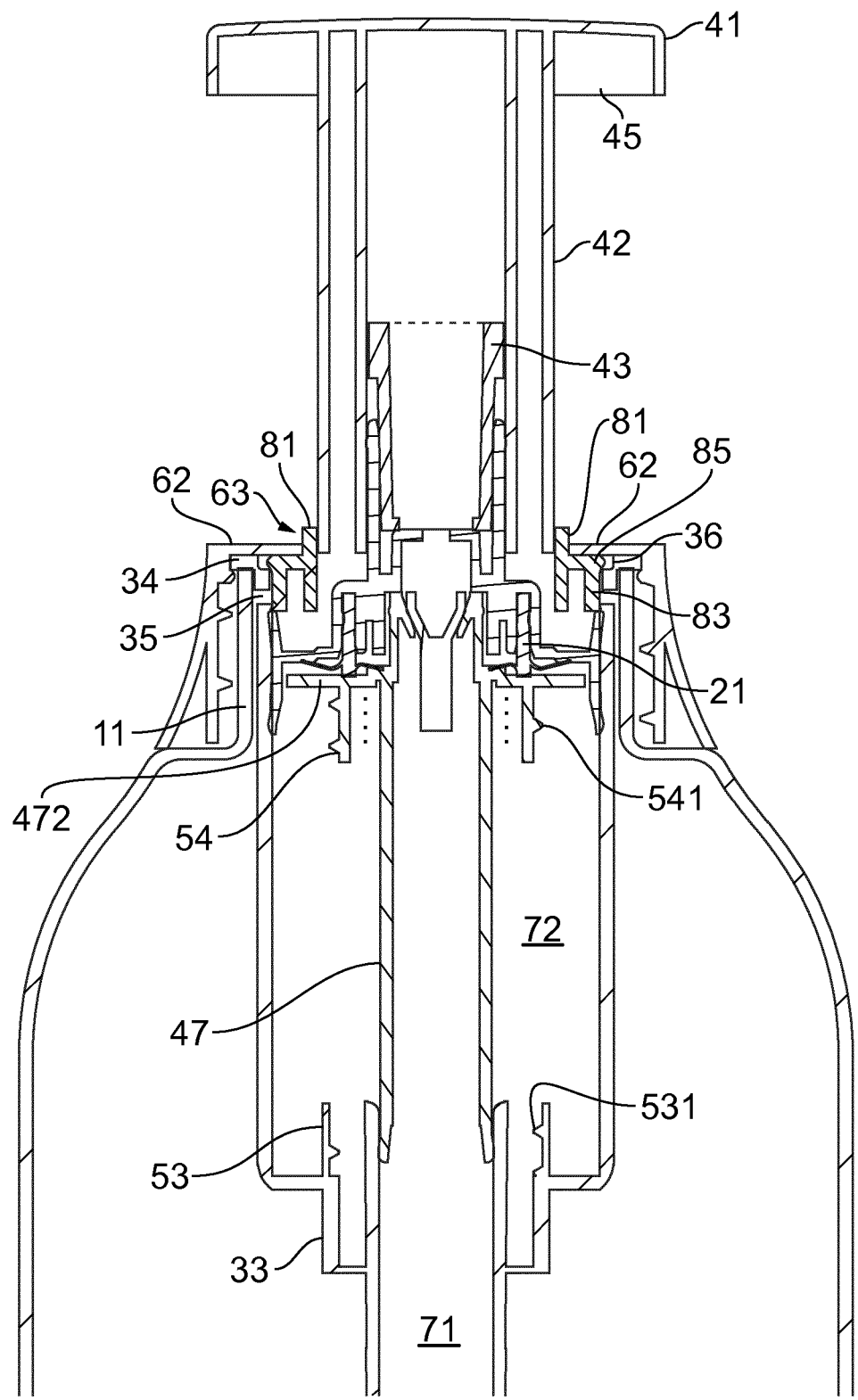
FIG. 5 is an enlargement of the top part of FIG. 4 showing the internal components in more detail in the extended position.

With reference to the drawing figures, a foam dispenser comprises a foamer pump 1 connected to the neck 11 of a container 100 for foamable liquid to be dispensed. The container 100 has an interior space 15 (FIG. 4). The pump consists of a body 3 and a plunger 4 reciprocable between extended and retracted (upper and lower) positions. The plunger has a stem 42 defining an outlet passage 74, and carrying an air piston 46 and a liquid piston 47. These pistons work respectively in an air cylinder 31 and a liquid cylinder 32 of the cylinder-defining element of the pump body 3. In the usual way the air cylinder 31 has much larger diameter than the liquid cylinder 32 so that, for the same piston stroke, they deliver their fluids in the appropriate ratio for foaming (usually about 8:1). This is all well known to a skilled person. The liquid cylinder 32 has an inlet valve 22 (FIGS. 2 and 4) into the liquid pump chamber 71, and a liquid outlet valve 23 leading via a liquid outlet into a mixing chamber 73. The liquid piston 47 is constituted by a lower element of the plunger stem socketed into the top plunger stem 42 (integral with the plunger head 41 having a nozzle 44 supplied from the outlet passage 74). The air piston 46 has an outwardly-directed seal 461 with upper and lower lips to engage the wall of the liquid cylinder 32. The air cylinder wall has a pair of vent holes 35 diametrically opposed near its top edge, and it will be noted that in the extended plunger position (FIG. 5) these vent holes are not covered by the air piston seal 461. They are positioned higher than conventionally.

A foam regulator module 43 is housed in the outlet passage 74 above the mixing chamber 73, and typically comprises a plastics mounting sleeve with nylon meshes at both ends to control foam bubble size. Again, this is well known. An air valve member 21 of elastomeric material, defining both an inlet lip and an outlet lip for air valving, is mounted in the air piston. It is operable to admit air into the air chamber 72 from above through holes (not shown) through the piston structure, when the plunger rises, and to allow air out of the air chamber 72 into the air outlet passage and inject it at high velocity into the mixing chamber 73 when the plunger is depressed, so that foam is formed and dispensed. It will be understood that variants of these well-known foamer structures may be used without affecting the concepts here. The liquid dose is e.g. about 1.5 ml.

The cylinder body 3 has an edge formation in the form of an outward flange 34 around its top edge, and this rests on the top edge 12 of the container neck 11. There may be a seal ring here, e.g. a resilient seal ring (not shown) or sufficient sealing into the neck may be provided by a plug fit. The body cylinder 3 is held in place by a retaining cap 6 which has a collar surround 65 with a decorative outer shroud and an internal thread 61, to engage a corresponding external thread (not shown) on the neck 11, and a top flange 62 projecting in to bear down on the cylinder body flange 34 and hold the pump construction together, sealed and fixed on the container neck. It also acts to trap the plunger 4 in place. The top flange 62 of the retaining cap 6 has a circular central opening slightly larger in diameter than the outer diameter of the top part of the plunger stem 42, so that an annular slot 63 is defined between them.

A characteristic feature is that the plunger 4 is designed to lock down into the pump. FIGS. 2 and 6-9 show this locked-down position (which is below the bottom of the usual pumping stroke). Specifically, the liquid piston 47, which is generally in the form of a tube with a bottom end lip fitting down inside the liquid cylinder 32, has an outward flange 472 at its top end, adjacent the air piston, and a downward skirt on this flange with an exterior thread 541 constitutes a lock-down formation 54 of the plunger. Opposing this, at the connection region or transition region 33 between the large-diameter air cylinder 31 and the small-diameter liquid cylinder 32, an upwardly-directed lock-down formation 53 of the body is provided by an upward skirt and a corresponding inwardly-directed thread 531. By pushing the plunger down to its normal limit and then turning clockwise, these threads can engage to bring the plunger head 41 hard down against the top flange 62 of the retaining cap 6. This is a notably compact configuration for shipping and retail display, quite unlike conventional foamers.

Figure 6:
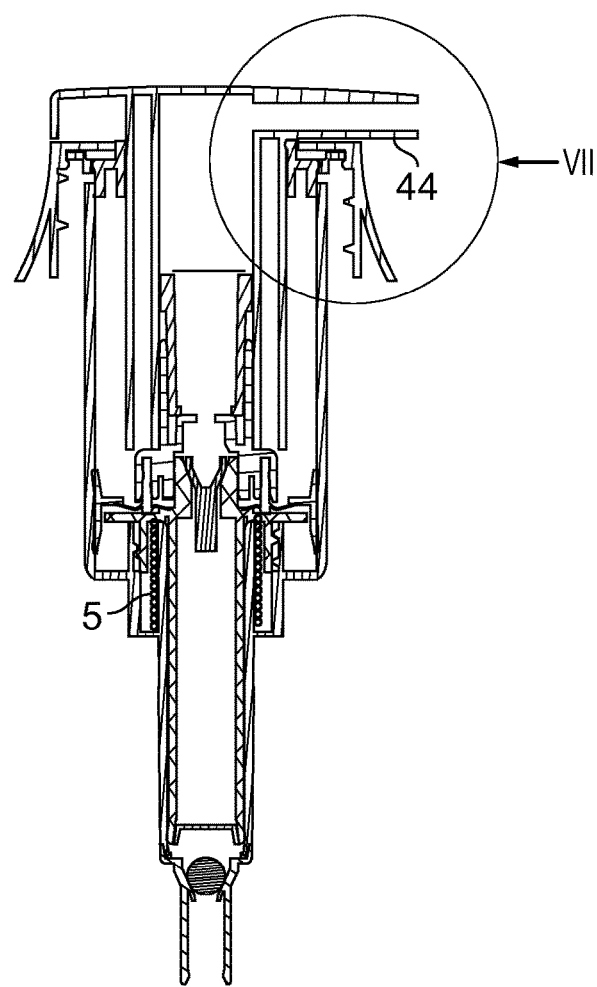
FIG. 6 is an axial cross-section at right-angles to that of FIG. 5 showing the plunger nozzle, in a locked-down position with the vent blocked.
Figure 8:
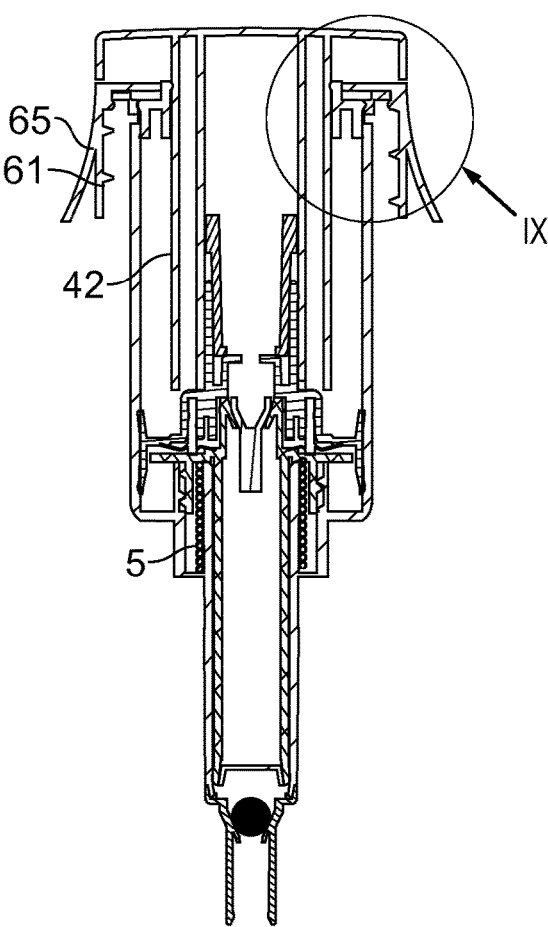
FIG. 8 is an axial cross-section at right-angles to that of FIG. 6 i.e. corresponding to FIG. 2, again in the locked-down position.
Figure 7:
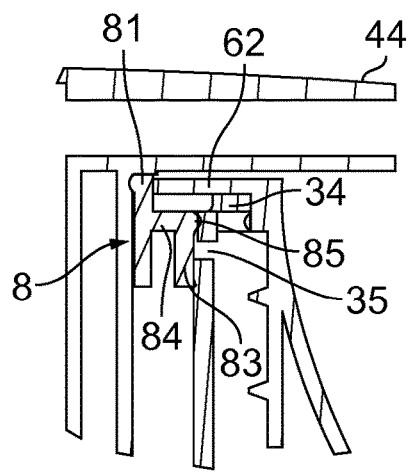
FIG. 7 is an enlarged detail at VII of FIG. 6.
Figure 9:
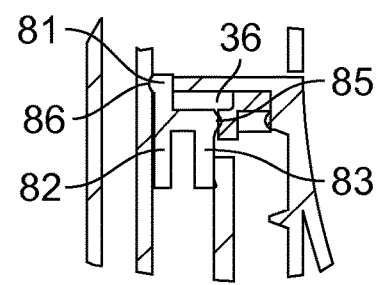
FIG. 9 is an enlarged detail at IX of FIG. 8.
Figure 10:
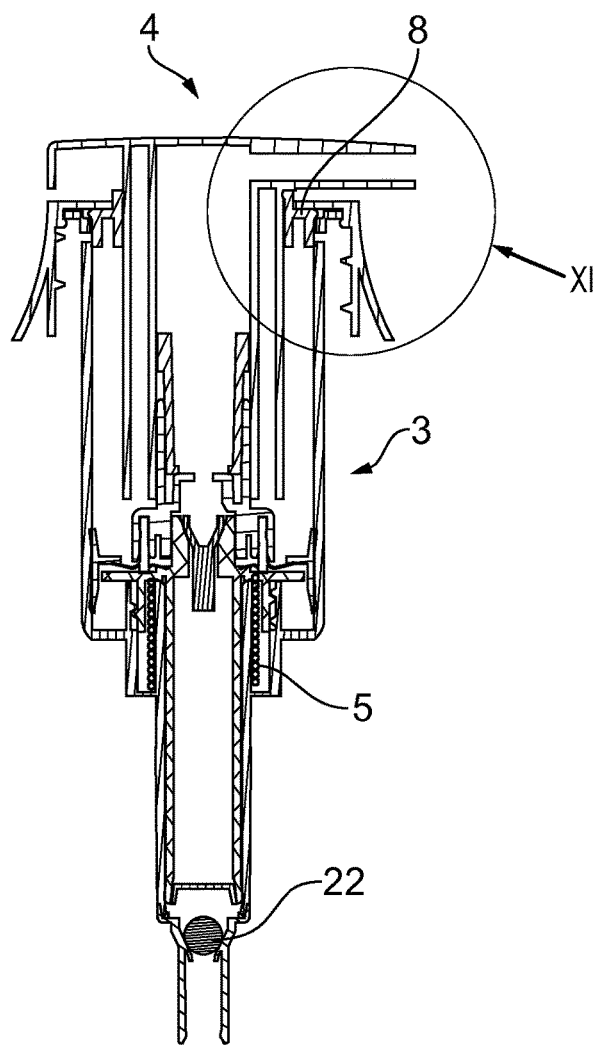
FIGS. 10 to 13 are Figures corresponding to FIGS. 6 to 9 showing a position immediately after release of the down-lock engagement with the plunger slightly risen and the vent unblocked.
Figure 12:
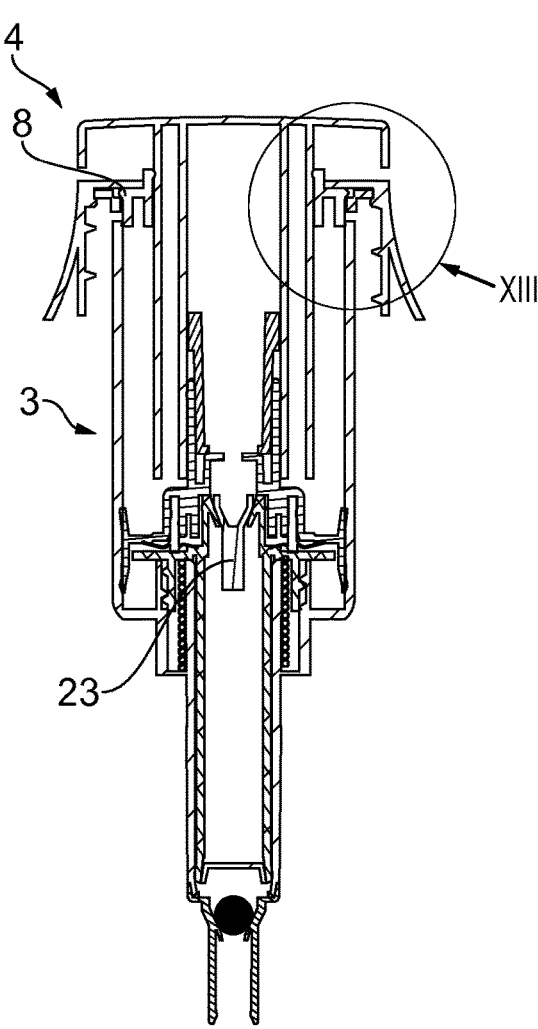

The plunger is urged towards the extended position by a pump spring 5, indicated in FIGS. 6 and 8, in the air pump chamber 72 and guided around the piston stem, to avoid metal contact with the liquid product.

In a conventional foam dispenser the vent holes, opening through the side wall of the air cylinder, would be open in this locked-down position and could allow liquid from the container interior 15 to escape into the space above the air piston, causing it to appear through the retaining cap in an unsightly and inconvenient way when the plunger rises e.g. on being released from the locked-down position. In the present dispenser this problem is avoided as follows. A vent block element 8, in the form of a one-piece moulded ring, is mounted around the plunger stem just beneath the top flange 62 of the retaining cap 6. The vent block ring 8 has a generally uniform cross-section and consists of a central guide sleeve 82 with a top annular projection 81 having an inward lip 86, an outer seal ring 83 and a radial flange 84 bridging between outer ring and guide sleeve—see FIG. 9. The guide sleeve 82 is cylindrical and can slide on the plunger stem 42 with wiping engagement of its inward lip 86. The surface of the outer seal ring 83 has a divergent outward sealing lip 85 at its top edge, slightly larger in diameter than the internal diameter of the air cylinder wall at this region, where the vent openings 35 lie. Right at the top, immediately inside the top flange 34 of the cylinder body 3, the internal diameter of the cylinder body 3 has a radial enlargement or relief clearance 36 into which (in an upward position of the ring 8) the outward sealing lip 85 of the vent block element 8 can expand to release the seal that it makes around the cylinder diameter above the vent openings when in the downward position. Being actuated and held or moved by positive mechanical engagement with the plunger in its down position, the vent block ring can be moulded from a standard polymer, unlike the flexible elastomeric rings which have sometimes been used as vent valves in dispensers, and which act only by deforming under fluid pressure against their own elastomeric resilience.

Figure 11:
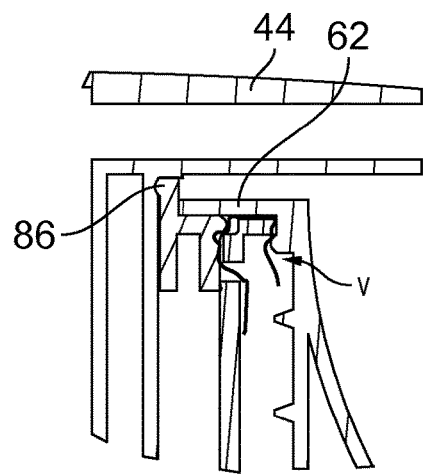
Figure 13:
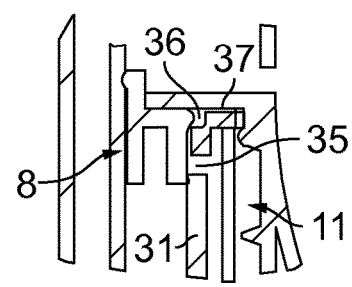

Accordingly the operational position of the element 8, as seen in FIG. 5, is as high as possible with its outward sealing lip 85 projecting non-sealingly into the relief clearance 36, its inner projection 81 projecting up out through the annular clearance 63 between the cap flange 62 and the stem 42, and its flange 84 butting up against the underside of the flange 62 to limit its movement. In this position the relatively recessed (smaller-diameter) part of its outer surface presents itself to the cylinder wall vents 35, so that venting is possible as indicated by line V in FIG. 11.

The flange has a series of grooves or recesses 37 at selected circumferential positions such that exterior air can flow in under the shroud 65, up through the threads connecting to the neck, over the top of the container neck 11 and flange 34 through the grooves 37 and down on the inner side of the cylinder wall, past the relaxed lip 85 of the vent block ring 8, through the cylinder vent 35 and into the container interior 15. Other vent paths are possible. This one assumes that venting will not occur around the plunger stem owing to the close fit of the ring 8 there.

FIG. 3 shows how the top projection 81 of the vent block element 8 appears above the level of the retaining cap 6.

By means of the construction described, this vent arrangement is closed off when the plunger 4 is locked down. As is conventional, the plunger head has an outer shroud moulding including the nozzle 44 and usually also at least one radial rib 45, with lower extremities at the level of the bottom of the head 41. When the plunger head is locked down (and only then) the nozzle 44 and optionally also a head rib 45 engages the top extremity 81 of the vent block element 8 as an actuating formation of the plunger and pushes it down, forcing the vent block element 8 down and compressing its outward seal lip 85 in around the diameter of the cylinder above the vent holes 35 so that the vent holes 35 are blocked against flow. In this position there is no risk of liquid escaping through the vent, even if the container is shaken or tilted.

In the locked-down position the inward lip 86 of the vent blocking element engages the plunger stem 42 frictionally, or with actual slight interlock into an annular groove in the stem beneath the head. Accordingly when the plunger is unlocked and rises slightly as the lock-down threads disengage, to the position shown in FIGS. 10 to 13, the rising of the plunger lifts the vent blocking ring positively out of its vent blocking position and opens the vents 35 for operation.

The skilled person will understand that the vent block element and its relationship with the vents and the plunger head might be realised in a number of different ways. For example, the vent block element might have circumferentially-localised relief portions (rather than axially-localised as in the illustrated embodiment), and be constructed to be circumferentially engaged by the plunger head (e.g. by a rib as suggested above) when the plunger head is being turned during the lock-down movement. Most plunger lock-down mechanisms require a turning movement. Thus, by arranging corresponding circumferentially-directed abutment surfaces on the actuating projection portion 81 of the vent block element, the plunger can turn the vent block element between a position in which its seal portion blocks off the vents and a position in which its seal portion leaves the vents available for air flow. By having abutments directed in both circumferential directions, this action can be available for both the locking and the unlocking movements of the plunger head, so that the vent operates repeatably in the correct sense.

In the illustrated example the stroke of the plunger is about 30 mm for the 1.5 ml dose, and the cylinder body diameter correspondingly reduced so that the dispenser can use a container 100 with a neck 100 of conventional 33 mm diameter. This reduces weight and cost. The narrow neck increases pump styling options, i.e. the pump cap and collar can be given decorative forms which may blend with the container as shown in the example. The lock-down shipping mode is robust.

The invention claimed is:

1. A foam pump dispenser comprising a pump and a container having a neck edge and liquid to be dispensed held within an interior thereof, the foam pump dispenser comprising:
   a pump body, mounted in the neck of the container, including: (i) a cylinder body with a wall having an edge formation retained at the container neck, and containing a liquid pump having a liquid pump chamber defined between a liquid cylinder and a liquid piston and an air pump has an air pump chamber defined between an air cylinder and an air piston, (ii) an outlet leading through an outlet passage to a discharge opening, (iii) an air inlet valve and a liquid inlet valve being respectively provided for the air chamber and liquid chamber, (iv) an air discharge passage and a liquid discharge passage each leading from their respective chambers through a mixing chamber having a permeable foam-regulating element and to the outlet passage, and (v) a vent formed in the wall of the cylinder body adjacent the neck edge of the container to communicate between the interior of the container and the air pump chamber;
   a plunger, reciprocable relative to the pump body, configured to alter the volume of a pump chamber defined in the pump body and wherein the liquid piston and air piston are reciprocable together in their respective cylinders by reciprocation of the plunger;
   an inlet valve, to prevent reverse flow so that reciprocation of the plunger sequentially refills the liquid pump chamber through the liquid inlet and discharges fluids in the mixing chamber contents through the permeable foam-regulating element and out of the outlet; and
   a vent block element disposed in the cylinder body adjacent the vent, and moveable between blocked and unblocked positions relative to the vent, and in which the vent block element is engaged by the plunger selectively in a retracted position of the plunger, to position the vent block element towards or in the blocked position or the unblocked position.

2. The foam pump dispenser of claim 1 wherein the vent block element has an integral actuating formation which is engaged by a corresponding actuating formation of the plunger selectively in a locked-down position of the plunger, whereby when the plunger is locked down the vent block element blocks the vent, while in an extended position of the plunger the vent block element is in the unblocked position.

3. The foam pump dispenser of claim 1 wherein the vent block element is annular, extending around the cylinder body.

4. The foam pump dispenser of claim 1 wherein a plurality of vents are provided and circumferentially spaced about the wall of the cylinder body, with a single vent block element controlling the plurality of vents.

5. The foam pump dispenser of claim 1 wherein the vent is one or more through-holes in the wall of the cylinder body.

6. The foam pump dispenser of claim 1 wherein movement of the vent block element between the blocked and unblocked positions is axial relative to the cylinder body.

7. The foam pump dispenser of claim 6 wherein the axial movement of the vent block element from the blocked to the unblocked position is driven by movement of the plunger so that the vent block element engages a stem of the plunger.

8. The foam pump dispenser of claim 1 wherein movement of the vent block element between the blocked and unblocked positions is circumferential rotation relative to the cylinder body.

9. The foam pump dispenser of claim 1 wherein the cylinder body is mounted fixedly to the neck edge of the container, with the cylinder body recessed down into the container interior below the neck opening, the plunger reciprocates along a plunger axis that coincides with an axis the neck edge, a pump spring urges the plunger towards an extended position, and the outlet passage is defined within a stem of the plunger.

10. The foam pump dispenser of claim 1 wherein a dose size of fluid dispensed dispensed from the foam pump dispenser is from 0.5 to 3 ml.

11. The foam pump dispenser of claim 10 wherein a diameter the neck edge is less than 40 mm.

12. The foam pump dispenser of claim 11 wherein the dose size is 1.4 ml or more, and wherein the diameter of the neck edge is less than 36 mm.

13. The foam pump dispenser of claim 1 wherein a lock-down feature is provided wherein the cylinder body and the plunger have respective lock-down formations engageable with one another to lock the plunger in a fully-retracted position.

\* \* \* \* \*